United States Patent Office 3,442,498
Patented May 6, 1969

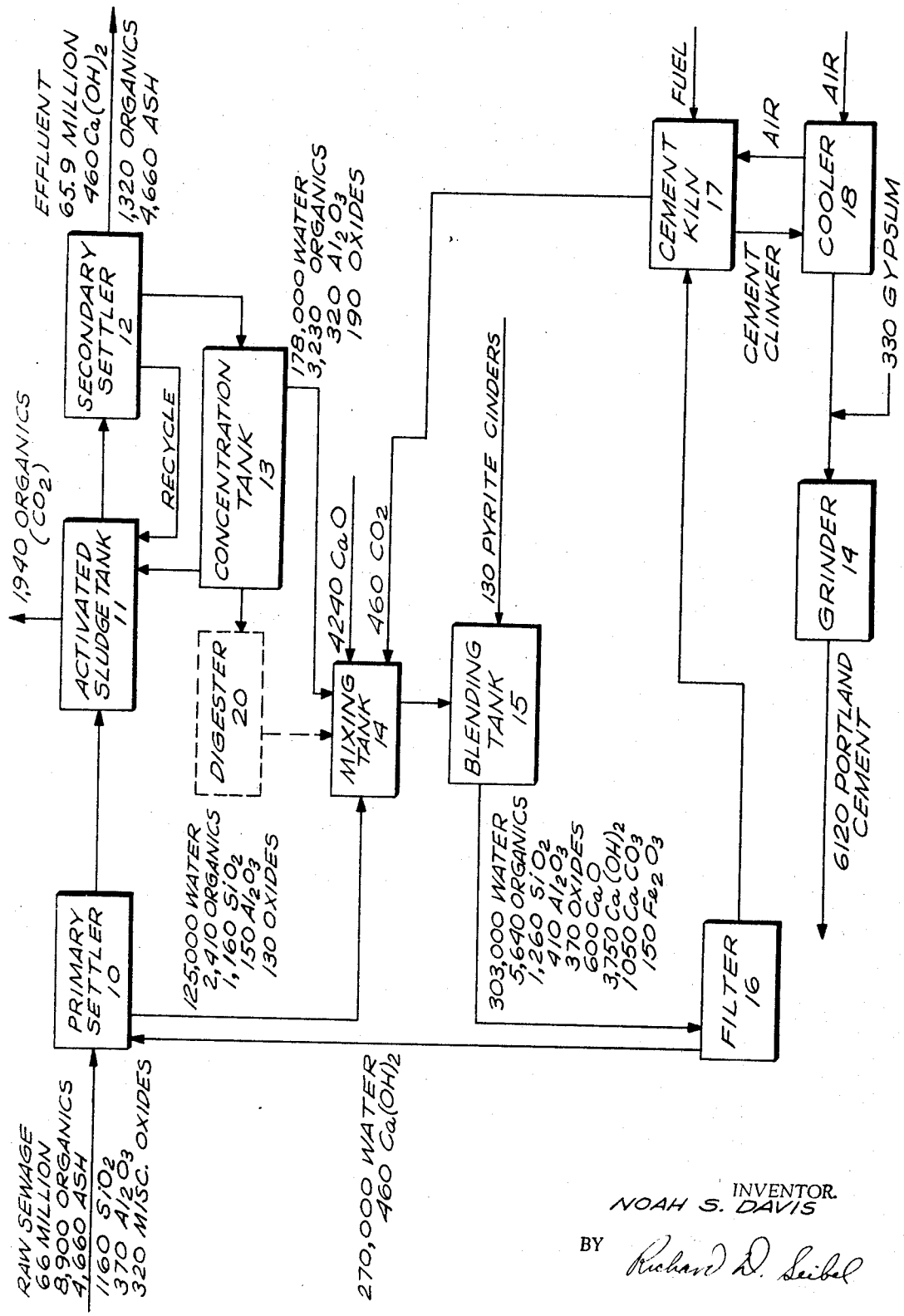

3,442,498
COMBINED WASTE TREATMENT AND CEMENT-MAKING METHOD AND MEANS
Noah S. Davis, Northridge, Calif., assignor to North American Rockwell Corporation, a corporation of Delaware
Filed June 13, 1967, Ser. No. 645,821
Int. Cl. C04b 7/48, 7/44, 7/36
U.S. Cl. 263—53                                5 Claims

ABSTRACT OF THE DISCLOSURE

An activated sludge sewage treatment process is combined with a cementmaking process for making cement economically from normally waste materials. Activated sludge is flocculated with sequential additions of carbon dioxide and calcium oxide, filtered, and fed to a cement kiln. The organics in the sludge reduce fuel requirements in the kiln and the resultant clinker is in the portland cement composition range.

Background

In the treatment of municipal or domestic sewage one of the principal problems is the disposition of sludge. In a typical sewage treatment process solids are separated and dissolved material is converted to solid microorganisms, all of which must be disposed of in some way. Typical dispositions of sludge include use as land fill or drying for fertilizer. These have been found to have limited applicability and most sludge is disposed of by oxidation to reduce its volume. The oxidation may be in solution in a so-called Zimmerman process, or the sludge may be burned in air to remove the organic materials. In either case a substantial amount of ash and incombustible solids remains and this is normally disposed of as land fill.

The disposition of solid material from waste treatment plants is expensive and it is therefore desired to produce an economically valuable material from these waste materials.

In many municipalities separate sewers are maintained for domestic wastes and storm waters; however, in many cities, particularly older ones, combined sewer systems are employed where common conduits are used for both domestic and industrial wastes and also storm waters. In these types of sewer systems substantial quantities of silt, sand, clay and ashes are washed into the sewer systems and must be processed in the sewage treatment facilities. In a municipality having separate sewer systems the treatment or organic wastes proceeds without substantial amounts of ash occurring in the final product which must be disposed of. In a combined sewer system, however, substantial amounts of inorganic material must also be disposed of with the organics. It is in these latter systems that a combination as provided in the practice of this invention is most applicable.

Summary of the invention

Thus in the practice of this invention, according to a preferred embodiment, there is provided a combination of sewage treatment plant and a plant for producing portland cement. In particular, an activated sludge sewage treatment plant provides a wet feed for a cement kiln producing cement clinker which is ground to produce portland cement.

Objects of this invention will be understood by reference to the following detailed description when considered in conjunction with the drawing which illustrates a typical flow diagram for a sewage treatment and cement-making process as provided in the practice of this invention.

Broadly the process described in further detail hereinafter comprises a conventional sewage treatment with changes in the additives employed for flocculation plus combustion of the filtered sludge in a cement kiln for producing portland cement. Raw sewage has primary sludge separated in a primary settler 10 and the effluent is converted to activated sludge by microorganisms in a tank 11. Settled and concentrated sludge has carbon dioxide and calcium oxide sequentially mixed therewith in a tank 14 to cause flocculation. After composition blending the sludge is filtered in a filter 16 and the filter cake is burned in a cement kiln 17, thereby producing cement clinker which is ground with gypsum in a grinder 19 to produce portland cement.

Thus as illustrated in the figure raw sewage is fed to a primary settler 10 which provides a relatively slow flow of sewage so that larger and heavier solid materials settle to the bottom of the tank and floating material such as fats and grease are skimmed from the surface of the sewage. The materials removed in the primary settler include both organics and a substantial amount of grit which principally comprises sand and argillaceous material.

In a typical embodiment about 66 million pounds of raw sewage per hour enters the system which is typical of a moderate size city's municipal waste. Throughout the description quantities of materials are stated in pounds per hour (sometimes merely stated as pounds) and these flow rates have been rounded off to the nearest 10 pounds or three significant figures which may lead to minor discrepancies in absolute balance of the flow diagrams. It should be recognized, of course, that the values set forth for flow rates are typical of a particular sewage composition and treatment process and that substantial variation in the quantities may occur in practice of this invention on other waste products and within the range of chemical additives found operable.

In a typical municipal sewage 66 million pounds would contain about 8,900 pounds per hour of organic materials in suspension and solution; about 4,660 pounds per hour of ash; about 1,160 pounds per hour of silica; about 370 pounds per hour of alumina and about 320 pounds per hour of miscellaneous metal oxides, principally being other components of argillaceous materials. Ash, for the purpose of discussion herein, comprises mineral matter such as the inherent hardness of the water and dissolved chemicals which are not organically decomposed in the activated sludge system.

In a typical embodiment a substantial amount of the organics and mineral solids are removed in the primary settler. Thus, for example, about 125,000 pounds per hour of water (about 15,000 gallons) may be removed containing 2,410 pounds per hour of organic materials; 150 pounds per hour of alumina; 130 pounds per hour of miscellaneous metal oxides; and substantially all of the silica in the raw sewage. This material, known as primary sludge, is settled or skimmed from the primary settler and is mixed with additional sludge prior to filtration as hereinafter described.

The liquid effluent with a substantial amount of suspended solids therein is passed from the primary settler 10 to an activated sludge tank 11. The activated sludge tank 11 comprises a conventional processing device wherein sewage is aerobically processed by microorganisms. These microorganisms employ the dissolved and suspended organic materials in the sewage as nutrient thereby converting substantial amounts of the organic materials to carbon dioxide which escapes from the activated sludge to the atmosphere. A substantial portion of the remaining organics are converted to cellular microorganisms which collectively are known as activated sludge. In a typical embodiment, as illustrated herein, about 1,940 pounds per hour of organic materials are converted to carbon dioxide which escapes to the atmosphere.

The activated sludge produced in the activated sluge tank 11 is passed to a secondary settler 12. In the settler 12. In the settler 12 the activated sludge rapidly settles from the liquid leaving a relatively clear supernatent. This supernatent liquid from the secondary settler has a sufficiently low biological oxygen demand (BOD) to be discharged as plant effluent to a receiving body of water such as a river, lake or ocean. In the embodiment illustrated herein the effluent of the plant is approximately 65.9 million pounds per hour which is principally water containing about 1,320 pounds per hour of organics and about 4,660 pounds per hour of ash dissolved therein. In addition, about 460 pounds per hour of calcium hydroxide is dissolved in the water as hereinafter described.

The solid microorganisms and the like in the activated sludge form a slurry having about 0.4% solids. The principal portion of the slurry from the secondary settler 12, usually as much as 15 million pounds per hour, is recycled to the activated sludge tank 11 in order to maintain a very high cell concentration of microorganisms so that the residence time in the aeration tank 11 for sewage treatment is relatively short. A portion of the activated sludge is removed from the cycle and circulated to a concentration tank 13 wherein the sludge is permitted to further settle to increase the solids content. The effluent liquid from the tank 13 is recycled to the activated sludge tank (or primary settler—not shown). In a typical embodiment as illustrated herein about 1,000,000 pounds per hour of activated sludge may be removed from the secondary settler 12 and cycled to a concentration tank.

The concentrated sludge slurry contains anywhere from about 0.75 to 2% solids and presents a considerable disposal problem in conventional plants because of the high water content and the inherent difficulty of filtering activated sludge. This material may typically comprise about 178,000 pounds per hour of water (about 21,400 gallons) containing 3,230 pounds per hour of organic materials; 220 pounds per hour of alumina and about 190 pounds per hour of miscellaneous metal oxides. The somewhat concentrated activated sludge is then passed to a mixing tank 14 where it is mixed with the primary sludge from the primary settler 10. The activated sludge is a relatively difficult material to filter and mixing with the primary sludge enhances the filterability thereof.

Also added in the mixing tank in a typical embodiment is 460 pounds per hour of carbon dioxide. This material is bubbled or sparged through the activated sludge in the form of exhaust gases from a cement kiln 17 hereinafter described, for a period of from about 10 to 30 minutes depending on the characteristics of the sewage sludge being treated. In general, the carbon dioxide, which forms as much as 20% of the exhaust gas, is added until the sludge is substantially saturated therewith but addition is terminated before the formation of bicarbonates in the sludge. It is preferred that the added carbon dioxide be in the range of from about 5 to 15 pounds per thousand gallons of sludge for each percent of solids suspended therein. It is found that within this range effective flocculation of the suspended solids is obtained. If the added carbon dioxide is less than about five pounds per thousand gallons per percent of solids, the flocculation is noticeably poorer, possibly due to a higher pH, and a lower filtration rate is obtained. It is preferred that the addition of carbon dioxide be less than about 15 pounds per thousand gallons of sludge since this represents a figure near the solubility limit thereof and additions beyond this value are of little increased efficacy.

Sequentially after addition of carbon dioxide about 4,240 pounds per hour of calcium oxide is added to the mixing tank 14 which, in combination with the carbon dioxide, cause flocculation of the sludge. This tank may comprise a mechanically stirred or airlift type mixer preferably in two separate chambers or may comprise merely a channel or conduit for continuous flow wherein carbon dioxide may be bubbled in a first region and a second region is subject to turbulent flow for mixing the calcium oxide. The calcium oxide is preferably hydrated prior to addition to the mixing tank and is conventionally known as slaked lime. If the calcium oxide is not hydrated prior to addition to the mixing tank, sprinkling a fine powder thereof on the turbulently mixed slurry involves substantially immediately hydration thereof and similar results are obtained. When slaked prior to addition to the mixing tank about 3 to 10 times as much water as calcium oxide is employed and the material is allowed to slake for a few minutes prior to addition. It has been found that slaking for as long as three hours prior to addition has no noticeably detrimental effect on the process.

It is preferred that calcium oxide be added to the activated sludge sequentially after the carbon dioxide and in the range of from about 30 to 200 pounds per thousand gallons of sludge for each percent of solids suspended therein. Additions of less than about 30 pounds per thousand gallons of calcium oxide are relatively less effective in causing flocculation and the filtration characteristics of the sludge are diminished. When more than about 200 pounds of calcium oxide is added per thousand gallons of sludge no significant change in flocculation characteristics is noted and any additional materials are present merely as filter aids. In general, the higher the amount of addition agents made to the sludge, the better is the flocculation.

It is preferred to mix the slaked lime with the slurry within about one minute and substantially instantaneous flocculation of the solids occurs upon addition of the slaked lime. The flocculated material may then be passed to a blending tank 15 from which a sample is taken for chemical analysis. Additional materials are added to the blending tank 15 as required in order to obtain a proper composition in the slurry. Thus, for example, in a typical embodiment about 130 pounds per hour of pyrite cinders may be added in order to increase the iron content of the product. Pyrite cinders are the oxidized product of roasting pyrite for producing sulfuric acid. Thus, after leaving the blending tank the material has a composition of about 303,000 pounds per hour of water (about 36,000 gallons) containing about 5,640 pounds per hour of organics; 1,260 pounds per hour of silica; 410 pounds per hour of alumina; 370 pounds per hour of miscellaneous metal oxides; 600 pounds per hour of calcium oxide; 3,750 pounds per hour of calcium hydrovide; 1,050 pounds per hour of calcium carbonate; and 150 pounds per hour of iron oxide.

At this point there would appear to be a discrepancy in material balance; however, this is accounted for in that the calcium oxide and pyrite cinders added in the mixing tank 14 are not pure materials. Thus, for example, commercial calcium oxide is employed which may comprise about 95% calcium oxide, about 2% silica, and about 1% alumina with some iron oxide also being present along with miscellaneous oxides. In addition, the pyrite cinders may be only about 90% iron with 6 to 7% silica and about 2% alumina also present. It is because of these variations in composition than an analysis is made of the product in the blending tank 15 and adjustments in composition made at this point in order to obtain the desired final product.

The slurry from the blending tank 15 is then vacuum filtered in a filter 16 in order to produce a relatively dry filter cake and extract most of the water from the slurry. This water, which may comprise about 270,000 pounds per hour, is recycled to the primary settler or to the plant effluent. The water from the filter contains about 460 pounds per hour of calcium hydroxide dissolved therein.

The filter cake from the filter 16, which may comprise 30 to 35% solids, is passed to a conventional cement kiln 17. It is preferred to employ a long rotary kiln of a type employed in conventional wet process cement manufacture. The first stages of this kiln serve to dry the filter cake and later stages incinerate the organic materials in the sludge, calcine the calcium hydroxide and calcium carbonate in the feed, and further heat the calcareous and argillaceous materials to a semi-molten state for producing cement clinker. A temperature of from 2600 to 3,000° F. is employed in making cement clinker and organic fuel such as oil, gas or pulverized coal and air are fed to the cement kiln at the outlet end thereof for producing the elevated temperature. The gases fed to the kiln flow counter-current to the solids therein and serve to preheat the filter cake. If desired, a separate preheater kiln can be employed prior to the cement kiln in order to preheat and dry the filter cake.

One of the substantial costs in a cement manufacturing operation comprises the fuel required for firing the kiln to the elevated temperatures required. Since the filter cake fed to the cement kiln in a preferred embodiment comprises a substantial amount of combustible organic materials a substantial fuel economy results since less fuel is required in the kiln. Thus, by combining activated sludge treatment with cement production and otherwise wasted organic materials are burned to produce heat for making cement and simultaneously are reduced in volume to avoid disposal problems.

In addition, the inorganic materials in the sewage are reacted with flocculating agents and other additions in order to produce cement clinker which has a substantial value. The cement clinker is also produced at a side adjacent cities where substantial uses of concrete are involved and a further beneficial effect is that transportation costs are reduced.

The cement clinker from the cement kiln 17 is preferably passed to a cooler 18 where it is cooled to about 500° F. or less by feed air for the cement kiln. After the cooler about 330 pounds per hour of gypsum, calcium sulfate, is added to the cement clinker. This mixture is then finely ground in a conventional closed circuit grinder 19 thereby producing about 6,120 pounds per hour of portland cement.

A typical analysis of portland cement comprises calcium oxide in the range of from about 60 to 65%; silica in the range of from about 17 to 25%; alumina in the range of from about 3 to 8%; iron oxide in the range of from about 0.5 to 6%; magnesium oxide in the range of from about 0.1 to 5.5%; sulphur trioxide ($SO_3$) in the range of from about 1 to 3%; (actually chemically bound as sulfates) and alkaline oxides such as sodium in the range of from about 0.5 to 1.3%.

In the practice of this invention according to a preferred embodiment the composition of cement clinker produced is well within the limits of the portland cement range after gypsum is added according to conventional practice. It will be apparent that additional materials can be added in the blender tanks to vary the composition in order to produce portland cement types for particular purposes without departing from the spirit of this invention. Thus, in a typical embodiment, municipal sewage from a treatment plant in Cleveland, Ohio, when treated according to the practice of this invention produces a material having a composition of about 60.9% calcium oxide; 23.1% silica; 7.2% alumina; 1.4% iron oxide; 1.2% sulphur trioxide; and 6.6% miscellaneous oxides which is well within the range of high quality portland cement.

It will be apparent to one skilled in the art that many variations in this composition can occur depending on the mineral content of the input sewage, the purity of the calcium oxide added, and the quantities of addition agents made to the blending tanks in order to adjust the composition. It is preferred to add these materials for varying composition in blending tanks prior to the filtering operation in order to minimize transient variations in composition and obtain through mixing of the solids prior to filtering. The solid particles added in the blending tanks also serve beneficially as filter aids in order to assist in filtration of the sludge.

A limitation on the combination described herein is in municipalities wherein substantial amounts of materials are present in the sewage which would interfere with production of high quality portland cement. Thus this combination is not useful in communities having a very large concentration of feldspars in the raw sewage. It is also desirable that the concentration of magnesium oxide and various phosphate compounds be low in the raw sewage. These are not severe limitations, however, and few communities have raw sewage containing substantial quantities of these interfering materials.

In another embodiment of combined sewage treatment and cementmaking facility the activated sludge, after concentration, is fed to a digester 20 such as shown by the dotted lines in the figure. The digester is a conventional item in sewage treatment plants and comprises a closed tank in which anaerobic bacteria decompose the organic materials in the activated sludge. Typically, the material resides in the digester for about 30 days when the tanks are maintained at about 95° F. During the course of anaerobic decomposition of the organic materials, substantial amounts of methane and carbon dioxide are produced. The methane is preferably employed for fuel in the process either for heating the digester, producing electricity, or preferably as auxiliary fuel for the cement kiln. The slurry product from the digester is known as digested sludge and this material is thereafter treated in substantially the same manner as activated sludge hereinabove described. It is found, however, that somewhat smaller quantities of flocculation agents may be employed with digested sludge as compared with activated sludge because of the relatively better filterability thereof.

In many instances digested sludge is preferred in combination with a cementmaking process since this material is relatively stable after digestion as compared with the biologically active activated sludge. Thus the digested sludge can be handled more in the manner of wet slurries in wet process cement manufacture than can the activated sludge. Thus the digested sludge may be processed in a mixing tank followed by correcting basins, blending basins, and storing basins as are conventionally employed in wet process cement manufacture for adjusting and smoothing composition variations in the feed to the cement kiln. Thus, for example, in wet process cement manufacture the slurry is often stored in basins with a capacity of from three to seven days of kiln feed. This affords substantial opportunity for smoothing out composition variations which may occur due to variations in the input materials. After blending the composition, the digested sludge with added flocculating agents is filtered and heated in the cement kiln to at least 2600° F. in the same manner as the activated sludge hereinabove described for producing cement clinker.

If desired a portion of the filter cake can be incinerated at lower temperature, such as about 1520° F., in a multiple hearth roaster to burn the organics and calcine the calcium compounds to calcium oxide. This calcium oxide is then recycled to the mixing tank 14 to cause flocculation in the manner described in copending U.S. patent application Ser. No. 645,817 entitled, "Waste Treatment Process With Recycling of Flocculating Agents" by N. S. Davis and O. J. Foust, on which this invention is an improvement.

Another related copending application involving different chemical additives to cause flocculation and somewhat different processes comprises U.S. patent application Ser. No. 645,818 entitled, "Waste Treatment Process With Recycling Lime," by N. S. Davis, O. J. Foust, and T. W. Withers.

It will be apparent that the above described processes are performed with conventional equipment and controls. Most of the equipment is already in use in conventional sewage or cement plants and requires no modification whatsoever. The controls can be manual or are preferably automatic to assure uniformity in the process.

It is to be understood that the above described examples are merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. A combination comprising:
    primary settler means for separating primary sludge from sewage;
    activated sludge means for aerobically converting organics in sewage to carbon dioxide and activated sludge;
    secondary settler means for concentrating the activated sludge;
    mixer means for adding carbon dioxide to the sludge;
    mixer means for adding calcium hydroxide to the sludge sequentially after adding the carbon dioxide;
    filter means for removing water from the sludge;
    a cement kiln;
    means for feeding filter cake from the filter means into said cement kiln;
    means for adding gypsum to cement clinker from said cement kiln; and
    means for grinding the cement clinker into portland cement.

2. A process for treating sewage and producing cement clinker comprising:
    mixing a sufficient quantity of carbon dioxide with sewage sludge to substantially saturate the sludge with carbon dioxide and less than sufficient to form substantial quantities of bicarbonates in the sludge;
    sequentially thereafter mixing hydrated calcium oxide with the sewage sludge whereby flocculation is effected;
    separating the flocculated solids from the liquids;
    heating the separated solids to a sufficient temperature for burning organic in said solids and for combining mineral oxides therein for producing cement clinker.

3. A process as defined in claim 2 wherein the calcium oxide is added in the range of from about 30 to 200 pounds of calcium oxide per 1000 gallons of sludge.

4. A process as defined in claim 2 wherein the carbon dioxide is added in the range of from about 5 to 15 pounds of carbon dioxide per 1000 gallons of sludge per one percent of solids suspended therein.

5. A process as defined in claim 4 wherein the calcium oxide is added in the range of from about 30 to 200 pounds of calcium oxide per 1000 gallons of sludge.

References Cited

UNITED STATES PATENTS

| | | | |
|---|---|---|---|
| 154,093 | 8/1874 | Scott | 106—103 X |
| 1,220,735 | 3/1917 | Elsner | 106—103 X |
| 1,876,123 | 9/1932 | Wright | 210—152 |
| 2,044,582 | 6/1936 | Lykken et al. | 210—45 |
| 2,044,584 | 6/1936 | Rankin | 210—45 |
| 2,072,154 | 3/1937 | Butterfield | 210—45 |
| 2,359,748 | 10/1944 | Clemens | 210—45 |
| 3,279,603 | 10/1966 | Busse | 210—67 |
| 3,342,731 | 9/1967 | Baumann et al. | 210—45 |
| 3,345,288 | 10/1967 | Sontheimer | 210—10 |

MICHAEL E. ROGERS, *Primary Examiner.*

U.S. Cl. X.R.

210—8, 10, 18, 45, 67, 152; 106—103; 110—8